(12) United States Patent
Matsumura et al.

(10) Patent No.: US 12,500,642 B2
(45) Date of Patent: Dec. 16, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 358 days.

(21) Appl. No.: 18/247,147

(22) PCT Filed: Sep. 30, 2020

(86) PCT No.: PCT/JP2020/037319
§ 371 (c)(1),
(2) Date: Mar. 29, 2023

(87) PCT Pub. No.: WO2022/070361
PCT Pub. Date: Apr. 7, 2022

(65) Prior Publication Data
US 2023/0318676 A1    Oct. 5, 2023

(51) Int. Cl.
*H04B 7/06*    (2006.01)
(52) U.S. Cl.
CPC ................ *H04B 7/0626* (2013.01)
(58) Field of Classification Search
CPC .... H04B 7/024; H04B 7/0626; H04B 7/0639; H04W 24/10
USPC ........................................ 370/329
See application file for complete search history.

(56) References Cited

U.S. PATENT DOCUMENTS

| | | | |
|---|---|---|---|
| 2020/0067631 A1 | 2/2020 | Kakishima et al. | |
| 2021/0028843 A1* | 1/2021 | Zhou | H04L 5/0053 |
| 2021/0320704 A1* | 10/2021 | Hao | H04B 7/0632 |
| 2021/0328644 A1* | 10/2021 | Hao | H04B 7/0639 |
| 2022/0094399 A1 | 3/2022 | Gao et al. | |
| 2022/0302976 A1* | 9/2022 | Zhang | H04B 7/0626 |
| 2022/0337300 A1* | 10/2022 | Yuk | H04W 72/54 |
| 2023/0040058 A1* | 2/2023 | Huang | H04B 7/066 |
| 2023/0071931 A1* | 3/2023 | Huang | H04B 7/0639 |

(Continued)

FOREIGN PATENT DOCUMENTS

| | | |
|---|---|---|
| JP | 2020519124 A | 6/2020 |
| WO | 2020144602 A1 | 7/2020 |

OTHER PUBLICATIONS

Office Action issued in Japanese Application No. 2022-553355, mailed Nov. 26, 2024 (14 pages).

(Continued)

*Primary Examiner* — Robert J Lopata
(74) *Attorney, Agent, or Firm* — Osha Bergman Watanabe & Burton LLP

(57) ABSTRACT

A terminal according to an aspect of the present disclosure includes a receiving section that receives a channel state information (CSI) report configuration indicating that at least one of CSI for a single transmission/reception point (STRP) and CSI for multi-TRP (Multi TRP (MTRP)) is reported, and a control section that performs control to include, in a CSI report, at least one of the CSI for a STRP and the CSI for MTRP, based on information included in the CSI report configuration. According to an aspect of the present disclosure, even when MTRP is used, CSI measurement and report can be appropriately performed.

6 Claims, 9 Drawing Sheets

(56) References Cited

U.S. PATENT DOCUMENTS

2023/0087003 A1\* 3/2023 Hao .................. H04B 7/0632
                                                    370/329
2023/0208492 A1\* 6/2023 Chen ................. H04B 7/0626

OTHER PUBLICATIONS

International Search Report issued in PCT/JP2020/037319 on Apr. 27, 2021 (2 pages).
Written Opinion of the International Searching Authority issued in PCT/JP2020/037319 on Apr. 27, 2021 (4 pages).
Huawei, HiSilicon; "Discussion Summary for CSI enhancements MTRP and FR1 FDD reciprocity"; 3GPP TSG RAN WG1 Meeting #102-e, R1-2006973; E-meeting, Aug. 17-28, 2020 (35 pages).
Huawei, HiSilicon; "Technical Categorization for CSI enhancements MTRP and FR1 FDD reciprocity"; 3GPP TSG RAN WG1 Meeting #102-e, R1-2007268; E-meeting, Aug. 17-28, 2020 (17 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

SEPARATE CSI CONFIGURATION/REPORT — CSI-ReportConfig #1

SEPARATE CSI CONFIGURATION/REPORT — CSI-ReportConfig #2

JOINT CSI CONFIGURATION/REPORT — CSI-ReportConfig #3

FIG. 3

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, it is studied that one or a plurality of transmission/reception points (TRPs) (multi-TRP (MTRP)) perform DL transmission to a user terminal (User Equipment (UE)). It is also studied that the UE performs UL transmission to the one or plurality of TRPs.

However, in existing NR specifications such as Rel. 15, MTRP is not taken into consideration, and hence it is not clear how to perform CSI measurement and report when MTRP is used. Unless CSI measurement and report are performed appropriately, system performance may be deteriorated such as reduction in throughput.

In view of this, the present disclosure has one object to provide a terminal, a radio communication method, and a base station that enable appropriate CSI measurement and report even when MTRP is used.

Solution to Problem

A terminal according to an aspect of the present disclosure includes a receiving section that receives a channel state information (CSI) report configuration indicating that at least one of CSI for a single transmission/reception point (STRP) and CSI for multi-TRP (Multi TRP (MTRP)) is reported, and a control section that performs control to include, in a CSI report, at least one of the CSI for a STRP and the CSI for MTRP, based on information included in the CSI report configuration.

Advantageous Effects of Invention

According to an aspect of the present disclosure, even when MTRP is used, CSI measurement and report can be appropriately performed.

BRIEF DESCRIPTION OF DRAWINGS

FIG. 3 is a diagram to show an example of a separate CSI report configuration and a joint CSI report configuration.

Figure 1:
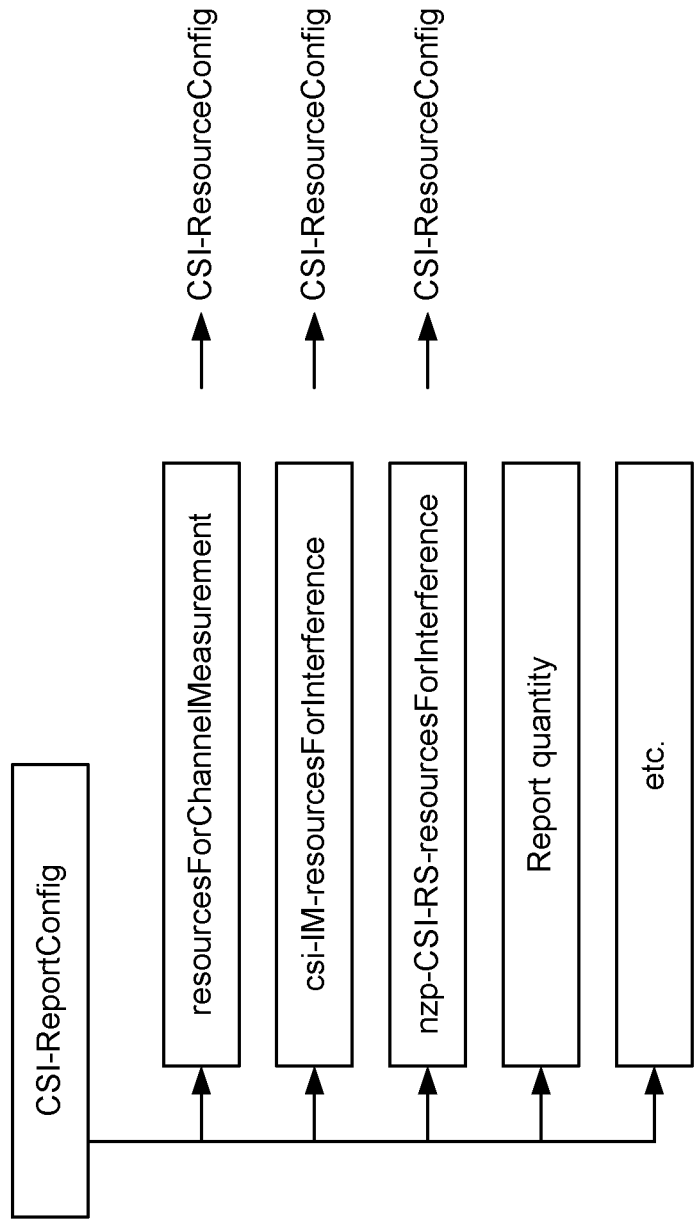
FIG. 1 is a diagram to show an example of a CSI report configuration in Rel-15 NR.

DESCRIPTION OF EMBODIMENTS (CSI Report (or Reporting))

In Rel-15 NR, a terminal (also referred to as a user terminal, a User Equipment (UE), and the like) generates (also referred to as determines, calculates, estimates, measures, and the like) channel state information (CSI), based on a reference signal (RS) (or resources for the RS) and transmits (also referred to as reports, feeds back, and the like) the generated CSI to a network (for example, a base station). The CSI may be transmitted to the base station on an uplink control channel (for example, a Physical Uplink Control Channel (PUCCH)) or an uplink shared channel (for example, a Physical Uplink Shared Channel (PUSCH)), for example.

The RS used for the generation of the CSI may be at least one of a channel state information reference signal (CSI-RS), a synchronization signal/broadcast channel (Synchronization Signal/Physical Broadcast Channel (SS/PBCH)) block, a synchronization signal (SS), a demodulation reference signal (DMRS), and the like, for example.

The CSI-RS may include at least one of a non-zero power (Non Zero Power (NZP)) CSI-RS and CSI-Interference Management (CSI-IM). The SS/PBCH block is a block including the SS and the PBCH (and a corresponding DMRS), and may be referred to as an SS block (SSB) or the like. The SS may include at least one of a primary synchronization signal (PSS) and a secondary synchronization signal (SSS).

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), L1-RSRP (reference signal received power in Layer 1 (Layer 1 Reference Signal Received Power)), L1-RSRQ (Reference Signal Received Quality), an L1-SINR (Signal to Interference plus Noise Ratio), an L1-SNR (Signal to Noise Ratio), and the like.

The UE may receive information related to CSI report (report configuration information), and control the CSI report, based on the report configuration information. The report configuration information may be a radio resource control (RRC) information element (IE) "CSI-ReportConfig," for example. Note that, in the present disclosure, the RRC IE may be interchangeably interpreted as an RRC parameter, a higher layer parameter, and the like.

The report configuration information (for example, the RRC IE "CSI-ReportConfig") may include at least one of the following, for example.

Information (report type information, for example, an RRC IE "reportConfigType") related to a type of the CSI reporting Information (report quantity information, for example, an RRC IE "reportQuantity") related to one or more quantities (one or more CSI parameters) of the CSI to be reported Information (resource information, for example, an RRC IE "CSI-ResourceConfigId") related to the resource for the RS used for generation of the quantity (the CSI parameter)

Information (frequency domain information, for example, an RRC IE "reportFreqConfiguration") related to the frequency domain being a target of the CSI report For example, the report type information may indicate a periodic CSI (P-CSI) report, an aperiodic CSI (A-CSI) report, or a semi-persistent CSI (Semi-Persistent CSI (SP-CSI)) report.

The report quantity information may specify at least one combination of the CSI parameters (for example, the CRI, RI, PMI, CQI, LI, L1-RSRP, and the like).

The resource information may be an ID of the resource for the RS. The resource for the RS may include, for example, a non-zero power CSI-RS resource or SSB, and a CSI-IM resource (for example, a zero power CSI-RS resource).

The frequency domain information may indicate frequency granularity of the CSI report. The frequency granularity may include, for example, a wideband and a subband. The wideband is the entire CSI reporting band. The wideband may be the entire band of a certain carrier (component carrier (CC), cell, or serving cell) or the entire bandwidth part (BWP) of the certain carrier, for example. The wideband may be interpreted as a CSI reporting band, the entire CSI reporting band, and the like.

The subband is part of the wideband and may be configured by one or more resource blocks (RBs) (or physical resource blocks (PRBs)). The size of the subband may be determined according to the size of the BWP (the number of PRBs).

The frequency domain information may indicate which one of PMIs of the wideband and the subband is to be reported (the frequency domain information may include an RRC IE "pmi-FormatIndicator" used for determination of either wideband PMI report or subband PMI report, for example). The UE may determine the frequency granularity of the CSI report (specifically, either the wideband PMI report or the subband PMI report), based on at least one of the report quantity information and frequency domain information.

When the wideband PMI report is configured (determined), one wideband PMI may be reported for the entire CSI reporting band. In contrast, when the subband PMI report is configured, a single wideband indication $i_1$ may be reported for the entire CSI reporting band, and one subband indication $i_2$ of each of one or more subbands of the entire CSI reporting (for example, a subband indication of each subband) may be reported.

The UE performs channel estimation by using a received RS to estimate a channel matrix H. The UE feeds back an index (PMI) determined based on the estimated channel matrix.

The PMI may indicate a precoder matrix (also simply referred to as a precoder) that the UE considers appropriate for the use for downlink (DL) transmission to the UE. Each value of the PMI may correspond to one precoder matrix. A set of values of the PMI may correspond to a different set of precoder matrices referred to as a precoder codebook (also simply referred to as a codebook).

The CSI report may include one or more types of CSI in the space domain. For example, the CSI may include at least one of a first type used for selection of a single beam (Type 1 CSI) and a second type used for selection of multi-beam (Type 2 CSI). The single beam may be interpreted as a single layer, and the multi-beam may be interpreted as a plurality of beams. Type 1 CSI may not assume multi-user multiple input multiple output (MIMO), and Type 2 CSI may assume multi-user MIMO.

The codebook may include a codebook for Type 1 CSI (also referred to as a Type 1 codebook and the like) and a codebook for Type 2 CSI (also referred to as a Type 2 codebook and the like). The Type 1 CSI may include Type 1 single-panel CSI and Type 1 multi-panel CSI for which different codebooks (Type 1 single-panel codebook and Type 1 multi-panel codebook) may be defined.

In the present disclosure, Type 1 and Type I may be interchangeably interpreted. In the present disclosure, Type 2 and Type II may be interchangeably interpreted.

An uplink control information (UCI) type may include at least one of Hybrid Automatic Repeat reQuest ACKnowledgement (HARQ-ACK), a scheduling request (SR), and CSI. The UCI may be carried on a PUCCH or may be carried on a PUSCH.

In Rel-15 NR, UCI can include one CSI part for wideband PMI feedback. CSI report #n includes PMI wideband information when CSI report #n is reported.

In Rel-15 NR, UCI can include two CSI parts for subband PMI feedback. CSI part 1 includes wideband PMI information. CSI part 2 includes one piece of wideband PMI information and several pieces of subband PMI information. CSI part 1 and CSI part 2 are separated and coded.

In Rel-15 NR, the UE is configured with N (N≥1) CSI report configuration report settings and M (M≥1) CSI resource configuration resource settings by a higher layer. For example, as shown in FIG. 1, CSI report configuration (CSI-ReportConfig) includes a resource setting for channel measurement (resourcesForChannelMeasurement), CSI-IM resource setting for interference (csi-IM-ResourceForInterference), NZP-CSI-RS setting for interference (nzp-CSI-RS-ResourceForInterference), report quantity (reportQuantity), and the like. Each of the resource setting for channel measurement, the CSI-IM resource setting for interference, and the NZP-CSI-RS setting for interference is associated with a CSI resource configuration (CSI-ResourceConfig, CSI-ResourceConfigId). The CSI resource configuration includes a list of CSI-RS resource sets (csi-RS-ResourceSetList, for example, an NZP-CSI-RS resource set or a CSI-IM resource set).

If interference measurement is performed in CSI-IM, the CSI-RS resources for channel measurement are associated, for each resource, with a CSI-IM resource in the orders of CSI-RS resources and CSI-IM resources in a corresponding resource set. The number of CSI-RS resources for channel measurement is equal to the number of CSI-IM resources.

In other words, for interference measurement based on CSI-IM, a channel measurement resource (CMR) and an interference measurement resource (IMR) have one-to-one mapping.

If the UE is configured with a CSI report configuration having report quantity (higher layer parameter reportQuantity) set in 'cri-RSRP,' 'cri-RI-PMI-CQI,' 'cri-RI-i1,' 'cri-RI-i1-CQI,' 'cri-RI-CQI,' or 'cri-RI-LI-PMI-CQI,' and also $K_s$ ($K_s$>1) resources are configured in a corresponding resource set for channel measurement, the UE derives, using the reported CRI as a condition, CSI parameters other than the CRI. CSI k (k≥0) corresponds to the (k+1)-th entry configured with the associated NZP-CSI-RS resource (nzp-CSI-RSResource) in the corresponding NZP-CSI-RS resource set (nzp-CSI-RS-ResourceSet) for channel measurement and the (k+1)-th entry configured with the associated CSI-IM resource (csi-IM-Resource) in the CSI-IM resource set (csi-IM-ResourceSet) if configured.

In other words, CSI k corresponds to the (k+1)-th configured CMR and the (k+1)-th configured IMR.

To enable more dynamic channel/interference hypotheses for NCJT by targeting both FR1 and FR2, evaluation and specification of CSI report for transmission of at least one of DL multi-TRP and multi-panel are studied.

(Multi-TRP)

For NR, it is studied that one or a plurality of transmission/reception points (TRPs) (multi-TRP, multi TRPs (MTRP)) perform DL transmission to a UE by using one or a plurality of panels (multi-panel). It is also studied that the UE performs UL transmission to the one or plurality of TRPs by using the one or plurality of panels.

Note that the plurality of TRPs may correspond to the same cell identifier (ID) or may correspond to different cell IDs. The cell ID may be a physical cell ID or a virtual cell ID.

Figure 2:
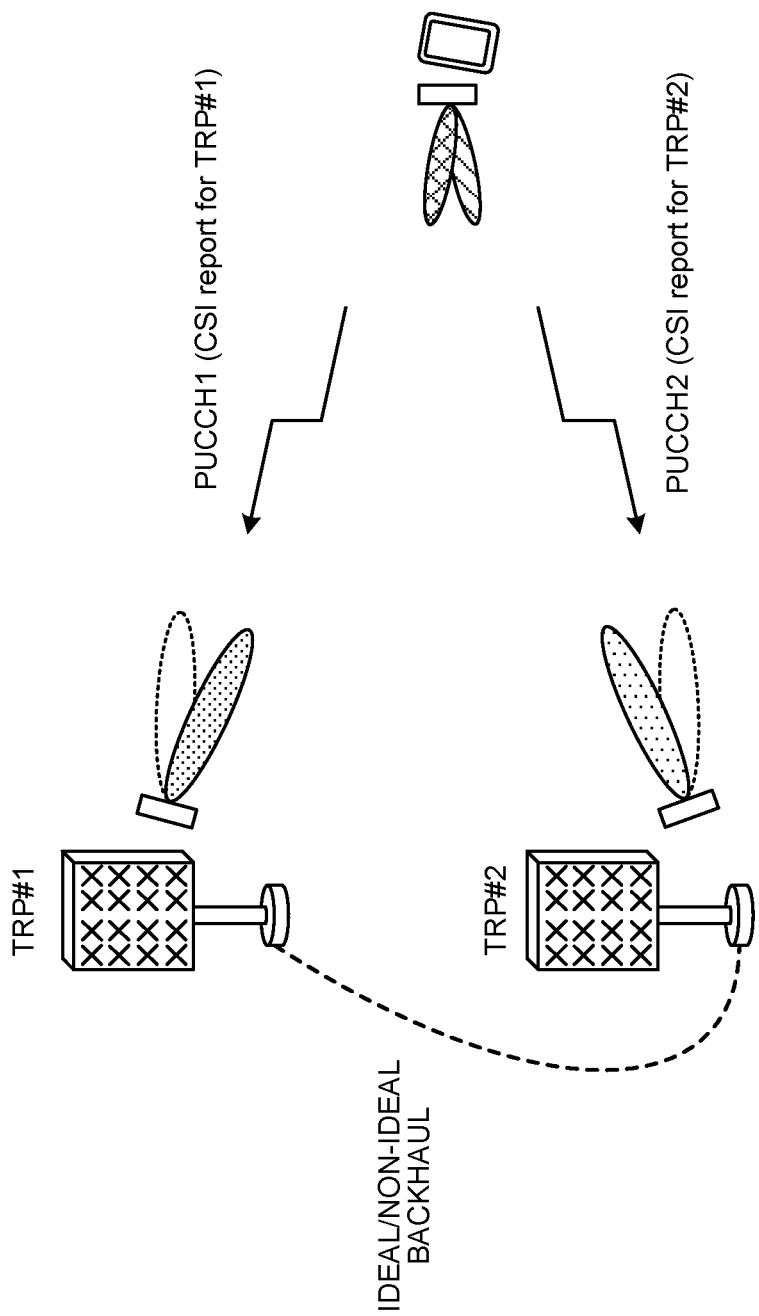
FIG. 2 is a diagram to show an example of a multi-TRP scenario.

FIG. 2 is a diagram to show an example of a multi-TRP scenario. In these examples, it is assumed that each TRP and the UE can use two different beams, but this is not restrictive.

The multi-TRP (TRPs *1 and *2) may be connected via ideal/non-ideal backhaul to exchange information, data, and the like. Each TRP of the multi-TRP may transmit a different codeword (Code Word (CW)) and a different layer. As one mode of multi-TRP transmission, non-coherent joint transmission (NCJT) may be employed.

In NCJT, for example, TRP 1 performs modulation mapping on a first codeword, performs layer mapping, and transmits a first PDSCH in layers of a first number (for example, two layers) by using first precoding. TRP 2 performs modulation mapping on a second codeword, performs layer mapping, and transmits a second PDSCH in layers of a second number (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from the first TRP and the second PDSCH from the second TRP may overlap in terms of at least one of the time and frequency resources.

The first PDSCH and the second PDSCH may be assumed not to be in a quasi-co-location (QCL) relationship (not to be quasi-co-located) Reception of the multi-PDSCH may be interpreted as simultaneous reception of PDSCHs of a QCL type other than a certain QCL type (for example, QCL type D).

The UE receives a plurality of PDSCHs (which may be referred to as multi-PDSCH (multiple PDSCHs)) from the multi-TRP, based on one or a plurality of pieces of DCI. In this example, the UE assumes to transmit, to different TRPs, separate CSI reports related to the respective TRPs. Such CSI feedback may be referred to as separate feedback, separate CSI feedback, and the like. In the present disclosure, "separate" may be interchangeably interpreted as "independent."

Note that such CSI feedback as to transmit, to one TRP, CSI reports related to both of the TRPs may be employed. Such CSI feedback may be referred to as joint feedback, joint CSI feedback, and the like.

In FIG. 2, the UE is configured to transmit, to TRP *1, CSI report for TRP *1 by using a certain PUCCH (PUCCH 1) and transmit, to TRP *2, CSI report for TRP *2 by using another PUCCH (PUCCH 2) (separate feedback). In a case of joint feedback, the UE transmits, to TRP *1 or *2, a CSI report for TRP *1 and a CSI report for TRP *2.

According to such a multi-TRP scenario, more flexible transmission control using a channel with higher quality is possible.

For multi-TRP transmission, pieces of CSI for a plurality of different TRPs are normally different from each other, and how to perform CSI measurement and report for the plurality of different TRPs is not clear. Assumption of channel/interference for one TRP changes depending on determination about transmission of peripheral TRPs (traffic).

For example, a CSI report for separate feedback (which may also be referred to as a separate CSI report) may be configured by using one CSI report configuration (CSI-ReportConfig) associated with one TRP.

The CSI report configuration may correspond to one assumption of interference for one TRP (in other words, a different CSI report configuration may be used for each TRP and each interference assumption). The CSI report configuration may correspond to a plurality of assumptions of interference for one TRP (in other words, a different CSI report configuration may be used for each TRP, and each one CSI report configuration may be associated with a plurality of assumptions of interference for a certain TRP).

For example, a CSI report for joint feedback (which may be referred to as a joint CSI report) may be configured by using one CSI report configuration (CSI-ReportConfig) associated with a plurality of TRPs.

The CSI report configuration may correspond to one assumption of interference for each of the plurality of TRPs (specifically, a CSI report including CSI with interference assumption *1 for TRP *1 and CSI with interference assumption *1 for TRP *2 may be configured by using a certain CSI report configuration, and a CSI report including CSI with interference assumption *2 for TRP *1 and CSI with interference assumption *1 for TRP *2 may be configured by using another certain CSI report configuration). The CSI report configuration may correspond to a plurality of assumptions of interference for each of the plurality of TRPs (in other words, a CSI report including two pieces of CSI with interference assumptions *1 and *2 for TRP *1 and two pieces of CSI with interference assumptions *3 and *4 for TRP *2 may be configured by using one CSI report configuration).

Note that a CSI report configuration for a joint CSI report may include a resource configuration (at least one of resource setting for channel measurement, CSI-IM resource setting for interference, and NZP-CSI-RS setting for interference) for each TRP. A resource configuration of a certain TRP may be included and configured in a resource configuration group (resource setting group).

Note that the resource configuration group may be identified by a configured resource configuration group index. The resource configuration group may be interchangeably interpreted as a report group. The resource configuration group index (which may simply be referred to as a group index) may represent a CSI report related to the TRP (to which TRP a certain CSI report (or CSI report configuration, CSI resource configuration, CSI-RS resource set, CSI-RS resource, TCI state, QCL, or the like) corresponds). For example, group index #i may correspond to TRP #i.

A CSI report configuration for a separate CSI report may be referred to as a separate CSI report configuration, a separate CSI configuration, and the like. A CSI report configuration for a joint CSI report may be referred to as a joint CSI report configuration, a joint CSI configuration, and the like.

For MTRP, it is preferable that single-TRP (STRP) transmission and MTRP transmission be dynamically switched according to a channel state and the like. To enable this, CSI as those described below are desired:

CSI for TRP 1 (first TRP) assuming STRP transmission (also referred to as CSI_A below)

CSI for TRP 2 (second TRP) assuming STRP transmission (also referred to as CSI_B below)

CSI for TRP 1 assuming NCJT transmission by MTRP and considering inter-TRP/beam interference from TRP 2 (also referred to as CSI_C below)

CSI for TRP 2 assuming NCJT transmission by MTRP and considering inter-TRP/beam interference from TRP 1 (also referred to as CSI_D below)

CSI_A and CSI_B may be fed back by separate feedback or may be fed back by joint feedback. However, when CSI_C and CSI_D are fed back by separate feedback, the following problems may occur.

Problem 1 is that, when a network performs transmission by NCJT, based on an RI and a PMI reported by a UE, the total RI (which may be interchangeably interpreted as the number of layers and rank) from two TRPs may exceed UE capability (for example, the supported maximum number of spatial multiplexing layers for DL reception (for example, indicated by an RRC parameter "maxNumberMIMO-LayersPDSCH")).

In this case, the network is required to obtain such RIs and PMIs as to satisfy the UE capability for NCJT. Alternatively, UE operation in a case where the total rank from the MTRP exceeds the UE capability (for example, the UE drops, does not decode, or the like a PDSCH(s) of some layers) may be defined.

Problem 2 is that, when the network performs NCJT transmission, based on an RI/PMI/CQI reported by the UE, reported inter-TRP interference may not match actual inter-TRP interference (in other words, reported CSI is not sufficiently accurate).

In this case, the network is required to obtain CSI for NCJT more suitable for the channel state.

To address these problems, it is studied to configure, for the UE, both a CSI report configuration for a separate CSI report (separate CSI report configuration) and a CSI report configuration for a joint CSI report (joint CSI report configuration).

Note that the separate CSI report may be used to report at least one of CSI_A and CSI_B described above. The joint CSI report may be used to report at least one of CSI_C and CSI_D described above.

FIG. 3 is a diagram to show an example of a separate CSI report configuration and a joint CSI report configuration. In the present example, the UE is simultaneously configured with CSI report configurations *1 and *2 related to the separate CSI report and CSI report configuration *3 related to the joint CSI report.

For example, CSI report configuration *1 may correspond to CSI_A for TRP 1, CSI report configuration *2 may correspond to CSI_B for TRP 2. CSI report configuration *3 may correspond to CSI_C and CSI_D for MTRP.

Note that it may be assumed, for joint CSI report, each of or the total of a first rank indicated by (the RI of) first CSI and a second rank indicated by (the RI of) the second CSI does not exceed a certain value.

The separate CSI report configuration may include information indicating that the CSI report configuration relates to separate CSI feedback, and the joint CSI report configuration may include information indicating that the CSI report configuration relates to joint CSI feedback.

However, as shown in FIG. 3, when the separate CSI report configuration and the joint CSI report configuration are configured by using different CSI report configurations, three CSI report configurations need be configured for the UE at minimum to enable CSI feedback for S-TRP transmission and M-TRP transmission, which causes communication overhead to be large.

In the example in FIG. 3, only an mDCI based MTRP transmission scheme is assumed for CSI feedback. In contrast, in Rel-16 NR, other transmission schemes, for example, sDCI based MTRP, SDM 1a, and the like, are adopted, and it is studied for Rel. 17, to adopt still other transmission schemes, for example, Single Frequency Network (SFN). The CSI feedback is desired to be capable of supporting these transmission schemes as well. Note that SDM 1a is a scheme in which PDSCHs transmitted from respective TRPs are space-division-multiplexed (SDMed).

Unless these problems are addressed, CSI report is not appropriately performed in a case of MTRP, and throughput reduction or communication quality degradation may occur.

Thus, the inventors of the present invention came up with the idea of a method for performing preferable CSI measurement and report even in a case of using MTRP.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted.

In the present disclosure, activate, deactivate, indicate, select, configure, update, determine, and the like may be interchangeably interpreted.

In the present disclosure, RRC, an RRC parameter, an RRC message, a higher layer parameter, an information element (IE), and a configuration may be interchangeably interpreted. In the present disclosure, a MAC CE, an update command, and an activation/deactivation command may be interchangeably interpreted. In the present disclosure, "support," "control," "controllable," "operate," and "operable" may be interchangeably interpreted.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), a certain resource (for example, a certain reference signal resource), a certain resource set (for example, a certain reference signal resource set), a CORESET pool, a PUCCH group (PUCCH resource group), a spatial relation group, a downlink TCI state (DL TCI state), an uplink TCI state (UL TCI state), a unified TCI state, QCL, and the like may be interchangeably interpreted.

A TCI state Identifier (ID) and a TCI state may be interchangeably interpreted. A TCI state and TCI may be interchangeably interpreted.

In the present disclosure, an index, an ID, an indicator, and a resource ID may be interchangeably interpreted. In the present disclosure, a sequence, a list, a set, a group, a cluster, a subset, and the like may be interchangeably interpreted.

In the present disclosure, a TRP index, a CORESET pool index (CORESETPoolIndex), a pool index, a group index, a CSI report setting group index, a CSI report group index, a CSI report configuration index, a CSI report setting group index, and a resource setting group index may be interchangeably interpreted.

In the present disclosure, resource setting for channel measurement, a resource for channel measurement, and resourcesForChannelMeasurement may be interchangeably interpreted. In the present disclosure, CSI-IM resource setting for interference, a CSI-IM based resource for interference measurement, csi-IM-ResourceForInterference, and a resource for interference measurement may be interchangeably interpreted. In the present disclosure, NZP-CSI-RS resource setting for interference, NZP-CSI-RS based resource for interference measurement, nzp-CSI-RS-ResourceForInterference, and a resource for interference measurement may be interchangeably interpreted.

In the present disclosure, a CSI report, a CSI report configuration, a CSI configuration, a resource configuration, and the like may be interchangeably interpreted.

In the present disclosure, a single PDCCH (DCI) may be referred to as a PDCCH (DCI) of a first scheduling type (for example, scheduling type A (or type 1)). A multi-PDCCH (DCI) may be referred to as a PDCCH (DCI) of a second scheduling type (for example, scheduling type B (or type 2)).

In the present disclosure, for single DCI, the i-th TRP (TRP #i) may mean the i-th TCI state, the i-th CDM group, and the like (i is an integer). For multi-DCI, the i-th TRP (TRP #i) may mean a CORESET corresponding to CORESET pool index=i, the i-th TCI state, the i-th CDM group, and the like (i is an integer).

In the present disclosure, it may be assumed that a single PDCCH is supported when multi-TRP uses ideal backhaul. It may be assumed that multi-PDCCH is supported when non-ideal backhaul is used between multi-TRPs.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. Note that terms are not limited to these.

In the present disclosure, multi-TRP (MTRP), a multi-TRP system, multi-TRP transmission, and multi-PDSCH may be interchangeably interpreted.

In the present disclosure, single DCI (sDCI), a single PDCCH, a multi-TRP system based on single DCI, sDCI based MTRP, two TCI states of at least one TCI codepoint being activated may be interchangeably interpreted.

In the present disclosure, multi-DCI (mDCI), multi-PDCCH, a multi-TRP system based on multi-DCI, mDCI based MTRP, two CORESET pool indices or CORESET pool index=1 (or a value equal to or larger than 1) being configured may be interchangeably interpreted.

(Radio Communication Method)

First Embodiment

A first embodiment relates to a CSI report configuration capable of supporting different transmission schemes such as mDCI based MTRP, sDCI based MTRP, SDM 1a, and SFN.

A CSI report configuration for joint CSI feedback may include an RRC parameter indicating the number of CSI parameters (CSI elements) to be reported per CSI reporting pair included in a CSI report. In the present disclosure, the CSI reporting pair may be interchangeably interpreted as a CSI pair, two pieces of CSI, and the like.

The RRC parameter may be report quantity (reportQuantity). The RRC parameter may indicate a piece(s) of CSI to report related to each of all the CSI pairs included in the CSI report.

The CSI parameter may be an RI/LI/PMI/CQI(s), for example. The number of RIs/LIs/PMIs/CQIs may determine transmission schemes or may contrarily be determined by transmission schemes.

For example, the UE may be configured to report two RIs, two LIs, two PMIs, and two CQIs per CSI reporting pair for mDCI based MTRP. Note that report of LIs may be omitted.

The UE may be configured to report two RIs, two LIs, two PMIs, and one CQI per CSI reporting pair for sDCI based MTRP. Note that report of LIs may be omitted.

The UE may be configured to report one RI, two PMIs, and one CQI per CSI reporting pair for SDM 1a.

The UE may be configured to report one RI, one PMI, and one CQI per CSI reporting pair for SFN.

Note that for a CSI reporting pair, it is preferable that the UE simultaneously measure CRI_C and CRI_D in a case of deriving one RI/one CQI.

Here, in the present disclosure, CSI parameters corresponding to CSI_A, B, C, and D are respectively denoted by adding "A," "_B," "_C," and "_D" to the end (for example, an RI corresponding to CSI_C is denoted by RI_C).

The number of CSI reporting pairs per CSI report may be one or more, may be defined in a specification in advance, or may be configured by RRC in relation to the CSI report configuration. The number of CSI reporting pairs may be the number of CRIs for the CSI report (for example, it may be assumed that the number of configured CRIs is the number of CSI reporting pairs).

When the number of CSI reporting pairs per CSI report is more than one, the number of configured RIs/LIs/PMIs/CQIs per configured CSI reporting pair may be applied to the pairs in common.

A CSI reporting pair(s) may be configured only for a CSI report configuration for CSIs for MTRP (which may be referred to as MTRP CSIs). CSI for each STRP (which may be referred to as STRP CSI, fallback CSI, and the like) may be obtained from another CSI report configuration.

Figure 4:
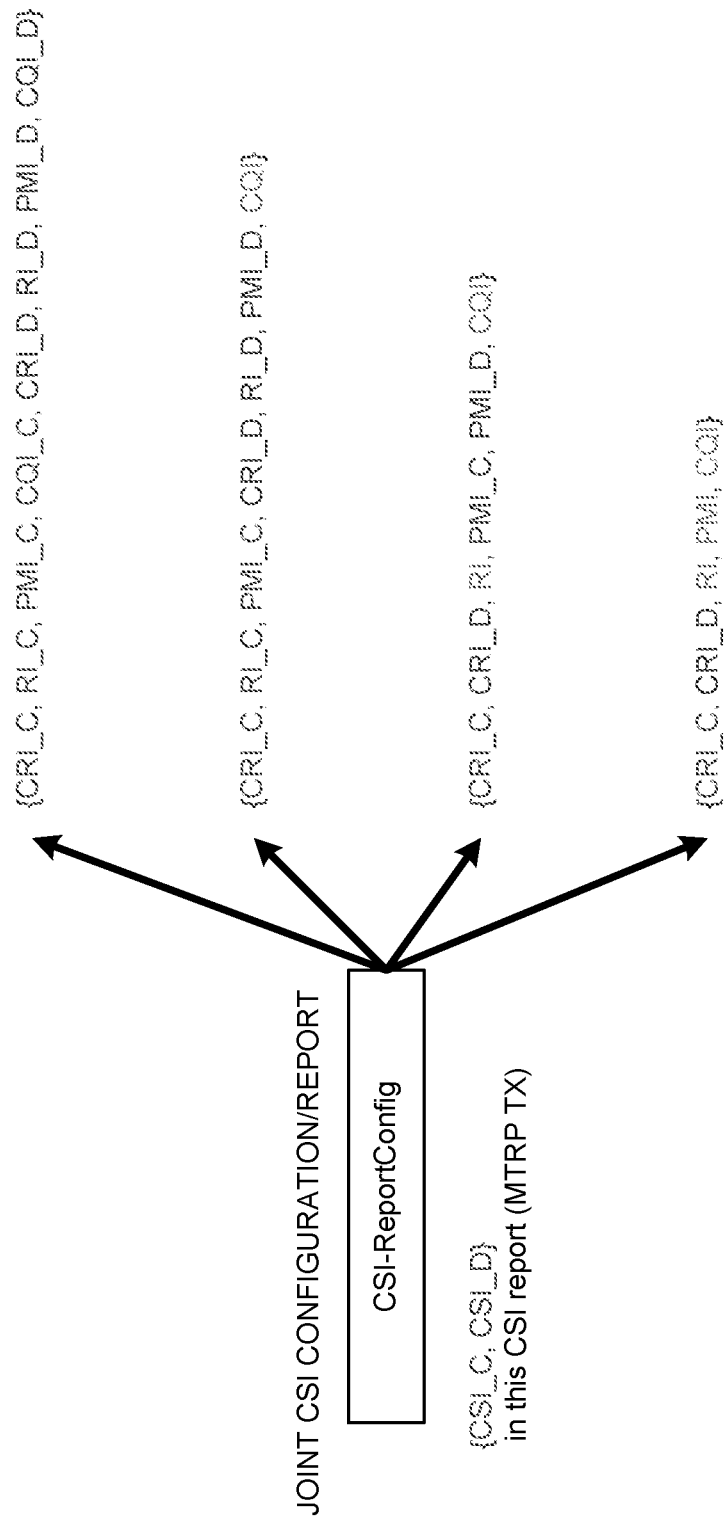
FIG. 4 is a diagram to show an example of a CSI report configuration capable of supporting different transmission schemes in a first embodiment.

FIG. 4 is a diagram to show an example of a CSI report configuration capable of supporting different transmission schemes in the first embodiment. The CSI report configuration (CSI-ReportConfig) shown in FIG. 4 is a CSI report configuration for joint CSI feedback, and it is assumed that the CSI report for this CSI report configuration includes at least various kinds of CSI for the CSI pair {CSI_C, CSI_D}.

FIG. 4 shows four examples of contents of a CSI report configurable by this CSI report configuration. The example shown at the top is a CSI report including {CRI_C, RI_C, PMI_C, CQI_C, CRI_D, RI_D, PMI_D, CQI_D} and is preferable for mDCI based MTRP.

The second example is a CSI report including {CRI_C, RI_C, PMI_C, CRI_D, RI_D, PMI_D, CQI} and is preferable for sDCI based MTRP.

The third example is a CSI report including {CRI_C, CRI_D, RI, PMI_C, PMI_D, CQI} and is preferable for SDM 1a.

The fourth example is a CSI report including {CRI_C, CRI_D, RI, PMI, CQI} and is preferable for SFN.

Note that the order of the CSI parameters in each CSI report shown in FIG. 4 is not restrictive.

According to the first embodiment described above, the UE can appropriately report a CSI report preferable for each different scheme, based on a CSI report configuration.

Second Embodiment

A second embodiment relates to a method for causing a CSI report configuration to support both fallback CSI and MTRP CSI.

The fallback CSI, the MTRP CSI, and the like may be referred to as a CSI type, a CSI report type, and the like.

The UE may be configured/activated/notified that both fallback CSI and MTRP CSI are reported in a certain CSI report configuration, by higher layer signaling (for example, RRC or a MAC CE) or physical layer signaling (for example, DCI), or a combination of these.

The fallback CSI may be determined for only one piece of CSI for one TRP (is not allowed to be changed according to configuration). This one piece of CSI may be selected by the UE or may be determined based on a specific rule. For example, this one piece of CSI may be CSI corresponding to at least one of the smallest TRP index, the smallest CORE-SET pool index, the smallest TCI state ID, and the smallest CSI report configuration index.

Note that, in the present disclosure, the "smallest" may be interchangeably interpreted as the "maximum," the "highest," the "lowest," the "i-th (i is an integer, for example, 1, 2, . . . )," and the like. In the present disclosure, "small" and "large" may be interchangeably interpreted.

The fallback CSI may be determined for two pieces of CSI for two respective TRPs (is not allowed to be changed according to configuration).

The fallback CSI may be configurable to be one piece of CSI for one TRP or two pieces of CSI for two respective TRPs, by RRC.

The fallback CSI may be configurable for up to M pieces of CSI per TRP, by RRC.

The fallback CSI may be configurable for up to M pieces of CSI in total for a STRP(s) by RRC.

The MTRP CSI may be determined for one CSI reporting pair for MTRP (is not allowed to be changed according to configuration).

The MTRP CSI may be configurable for up to N CSI reporting pairs for MTRP, by RRC.

Figure 5:
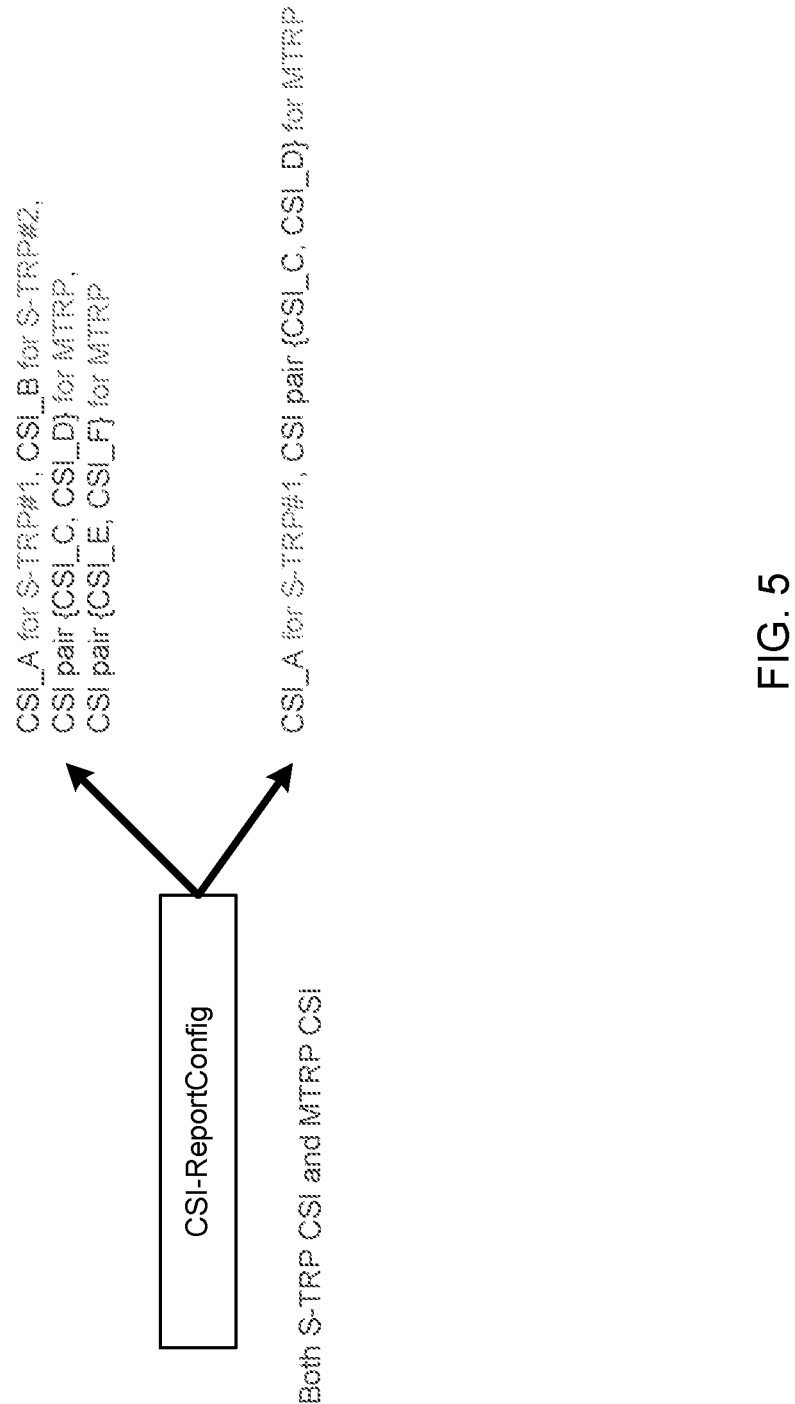
FIG. 5 is a diagram to show an example of a CSI report configuration in a second embodiment.

FIG. 5 is a diagram to show an example of a CSI report configuration in the second embodiment. The CSI report configuration (CSI-ReportConfig) shown in FIG. 5 is a CSI report configuration for both STRP CSI and MTRP CSI.

FIG. 5 shows two examples of contents of a CSI report configurable by this CSI report configuration. The example shown at the top is a CSI report including CSI_A for S-TRP *1, CSI_B for S-TRP *2, a CSI pair {CSI_C, CSI_D} for MTRP, and another CSI pair {CSI_E, CSI_F} for MTRP. Note that {CSI_E, CSI_F} is information equivalent to {CSI_C, CSI_D} but may mean another data (a CSI pair including another CSI parameters).

The second example is a CSI report including CSI_A for S-TRP *1 and a CSI pair {CSI_C, CSI_D} for MTRP. This is preferable for a case of desiring to know details of only TRP *1 using relatively small data amount.

According to the second embodiment described above, it is possible to preferably suppress an increase of overhead of a CSI report configuration.

Third Embodiment

A third embodiment relates to a method for causing a CSI report configuration to support both fallback CSI and MTRP CSI.

The UE may determine to report either one of fallback CSI and MTRP CSI in a certain CSI report configuration, based on higher layer signaling (for example, RRC or a MAC CE) or physical layer signaling (for example, DCI), or a combination of these.

When the UE reports either fallback CSI or MTRP CSI in a certain CSI report configuration, a base station may blind-detect, for the base station to decode CSI related to the CSI report configuration, the number of bits of this CSI from among conceivable candidates.

When the UE reports either fallback CSI or MTRP CSI in a certain CSI report configuration, a base station may determine, for the base station to decode CSI related to the CSI report configuration, whether the CSI is fallback CSI or MTRP CSI, based on explicit indication in the CSI (CSI report).

For example, a certain bit field (which may be referred to as, for example, a CSI report type filed and the like) included in the CSI report may indicate whether the CSI report is fallback CSI or MTRP CSI. In a case where the CSI report type field is one bit, if the value is 1, this may indicate that the CSI report is MTRP CSI, and if the value is 0, this may indicate that the CSI report is fallback CSI, for example.

The payload size of the CSI report may be the same in a case where the CSI report is fallback CSI and a case where the CSI report is MTRP CSI. When the CSI report is fallback CSI, the actual payload size of the fallback CSI is smaller than the payload size of the MTRP CSI, and hence a bit '0' (or '1') may be added (padded) to make the payload size of the fallback CSI be the same as the payload size of the MTRP CSI.

The MTRP CSI may be separated into two parts (CSI part 1 and CSI part 2). CSI part 1 and part 2 may have different configurations from those of existing CSI part 1 and part 2. CSI part 1 may have the size same as that of the fallback CSI and may include indication of whether CSI part 2 is present (exists). When CSI part 2 exists, CSI part 2 configures the remaining part of the MTRP CSI. When CSI part 2 does not exist, this may mean that the CSI report is fallback CSI.

Note that the indication of whether CSI part 2 is present may be indication indicating the size of CSI part 2 (for example, when the indication is a positive value, this may be indication indicating the size; when the indication is a value equal to or smaller than 0, this may be indication indicating absence of CSI part 2).

When the UE reports either fallback CSI or MTRP CSI in a certain CSI report configuration, a base station may determine, for the base station to decode CSI related to the CSI report configuration, whether the CSI is fallback CSI or MTRP CSI, based on implicit indication in CSI (CSI report).

For example, whether the CSI report is fallback CSI or MTRP CSI may be associated with the size of the CSI report or the size of value or content included in the CSI report.

Whether the CSI report is fallback CSI or MTRP CSI may be based on the number of reported pieces of CRI or the payload size of the CSI report. For example, a CSI report with the number of reported pieces of CRI being one may be fallback CSI, and a CSI report with the number of reported pieces of CRI being two may be MTRP CSI. A CSI report with the payload size being A or smaller (A is an integer, for example) may be fallback CSI, and a CSI report with the payload size being B (B>A) may be MTRP CSI.

Whether the CSI report is fallback CSI or MTRP CSI may be based on a value in one CSI pair. For example, for a CSI pair having a report format {CRI_C, CRI_D}, when the value of the RI is 0, this may mean fallback CSI. For RI=0, the LI/PMI/CQI other than the RI need not necessarily be reported.

In this case, the payload size of the CSI report may be the same for fallback CSI and MTRP CSI, and the fallback CSI may use the same report format for a CSI pair as that for MTRP. Some values may be enabled only for the fallback CSI, while some of other values may be enabled only for the MTRP CSI.

In the third embodiment, the number of pieces of fallback CSI or MTRP CSI to report in one CSI report may be similar to the number of pieces of fallback CSI or MTRP CSI per CSI report configuration in the second embodiment.

According to the third embodiment described above, it is possible to preferably suppress an increase of overhead of a CSI report.

<Variations of Second and Third Embodiments>

Whether to report both fallback CSI and MTRP CSI in a certain CSI report configuration may be specified for the UE, based on a specific field (or a specific codepoint corresponding to the specific field) of DCI.

For example, the specific field may be a TCI field indicating a TCI state. The specific codepoint may be the smallest or largest codepoint. Note that the DCI corresponding to the specific codepoint may be sDCI.

When the smallest or largest codepoint of the TCI field indicates one TCI state, the UE may assume to report only fallback CSI in a certain CSI report configuration.

When the smallest or largest codepoint of the TCI field indicates two TCI states, the UE may assume to report fallback CSI and MTRP CSI in a certain CSI report configuration.

<Others>

At least one of the above-described embodiments may be applied only to a UE that has reported specific UE capability or that supports the specific UE capability.

The specific UE capability may indicate at least one of the following:

whether to support report of a plurality of CSI pairs for MTRP in one CSI report for one CSI report configuration whether to support that different numbers of RIs/LIs/PMIs/CQIs reported for one CSI pair are configured whether to support both STRP CSI and MTRP CSI in one CSI report for one CSI report configuration the supported maximum number of pieces of STRP CSI reported in one CSI report the supported maximum number of pieces of MTRP CSI reported in one CSI report whether to support selection by the UE between STRP CSI and MTRP CSI in one CSI report for one CSI report configuration whether to support explicit (or implicit) indication for distinction between STRP CSI and MTRP CSI in one CSI report At least one of the above-described embodiments may be applied to a case where the UE is configured with specific information related to the above-described embodiment by higher layer signaling. For example, the specific information may be information indicating to enable MTRP/sDCI based MTRP/mDCI based MTRP or any RRC parameter for a specific release (for example, Rel. 17).

Note that, although a description has been given of the case of performing report of one or a plurality of CSI pairs in one CSI report for one CSI report configuration in the above-described embodiments, this is not restrictive. For example, the contents of the above-described embodiments may be applied to a case where a plurality of CSI reports for a plurality of CSI report configurations are associated (linked) for a plurality of TRPs (in other words, for respective different TRPs). In this case, a plurality (a description will be given below by assuming the number to be two) of linked CSI report configurations may be regarded as configuration pairs (which may be referred to as CSI configuration pairs). The UE may report two CSI reports related to two TRPs, based on the configuration pair.

The CSI reporting pair in the above-described embodiments may be interpreted as two linked CSI report configurations (or configuration pair) here.

In accordance with the above-described first embodiment, the number of reported RIs/LIs/PMIs/CQIs may be indicated for each CSI configuration pair.

In accordance with the above-described second embodiment, it may be configured/activated/notified that both fallback CSI and MTRP CSI are reported for each CSI report configuration in the CSI configuration pair. For example, a CSI report for CSI report configuration *1 may include CSI_A and CSI_C for TRP 1, and a CSI report for CSI report configuration *2 may include CSI_B and CSI_D for TRP 2.

CSI_C and CSI_D above may be pieces of CSI for MTRP joint transmission. When the UE selects to report CSI_C and CSI_D, the UE may select CRI_C in CSI_C (CMR for TRP 1) as an IMR for CSI_D and CRI_D in CSI_D (CMR for TRP 2) as an IMR for CSI_C.

In accordance with the above-described third embodiment, it may be determined that both fallback CSI and MTRP CSI are reported for each CSI report configuration. Note that determinations by the UE are preferably the same for CSI report configurations in the CSI configuration pair. For example, two linked CSI report configurations may both be determined to be related to fallback CSI or may both be determined to be related to MTRP CSI.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
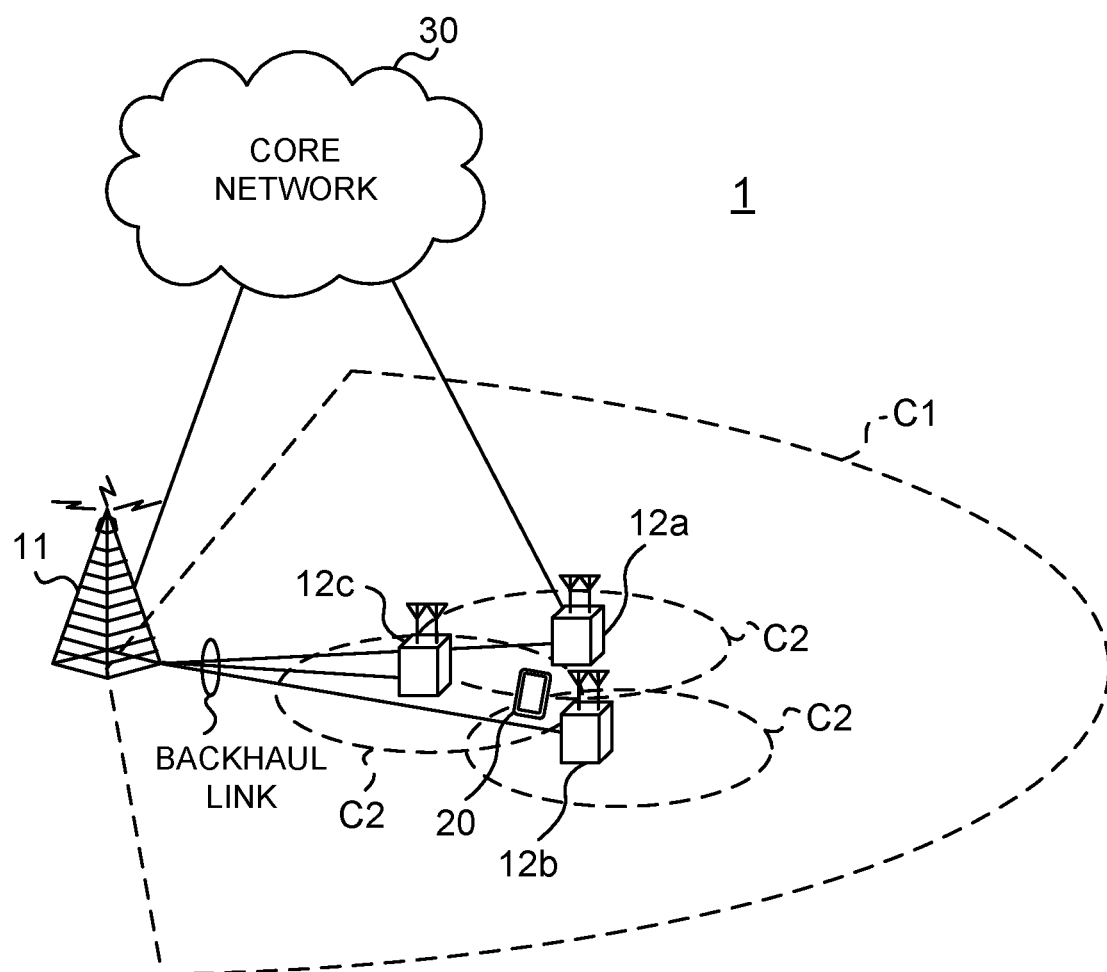
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC))

between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
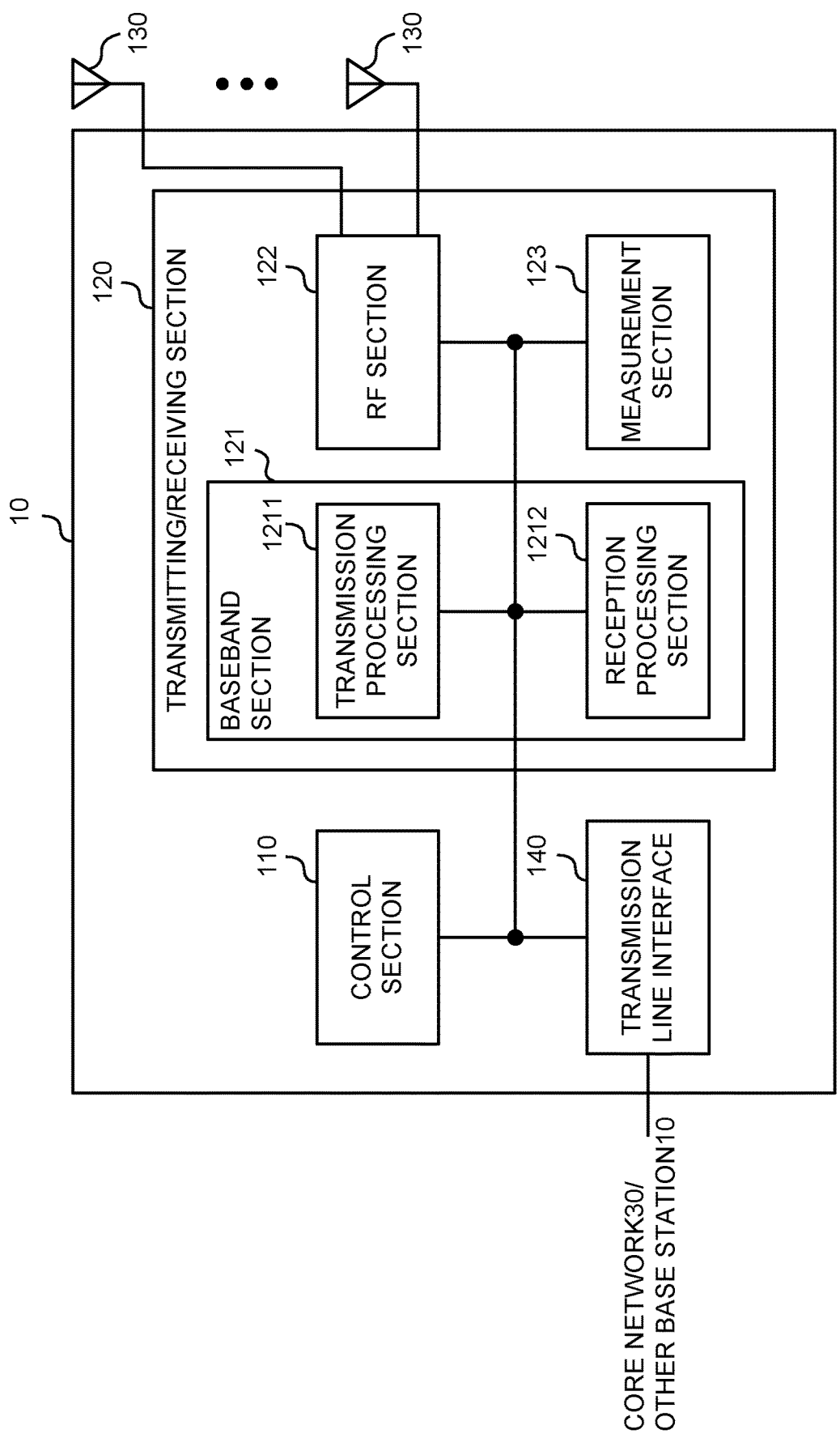
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data, control information and so on acquired from the control section 110, and may generate a bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a CSI report configuration related to a joint channel state information (CSI) report to the user terminal 20.

The transmitting/receiving section 120 may receive the joint CSI report for which the number of CSI parameters to be reported per CSI reporting pair is determined in the user terminal 20, based on information included in the CSI report configuration, the joint CSI report including the CSI reporting pair(s).

The transmitting/receiving section 120 may transmit, to the user terminal 20, a CSI report configuration indicating that at least one of channel state information (CSI) for a single transmission/reception point (STRP) and CSI for multi-TRP (Multi TRP (MTRP)) is reported.

The transmitting/receiving section 120 may receive a CSI report in which at least one of the CSI for a STRP and the CSI for MTRP is included by the user terminal 20, based on information included in the CSI report configuration.
(User Terminal)

Figure 8:
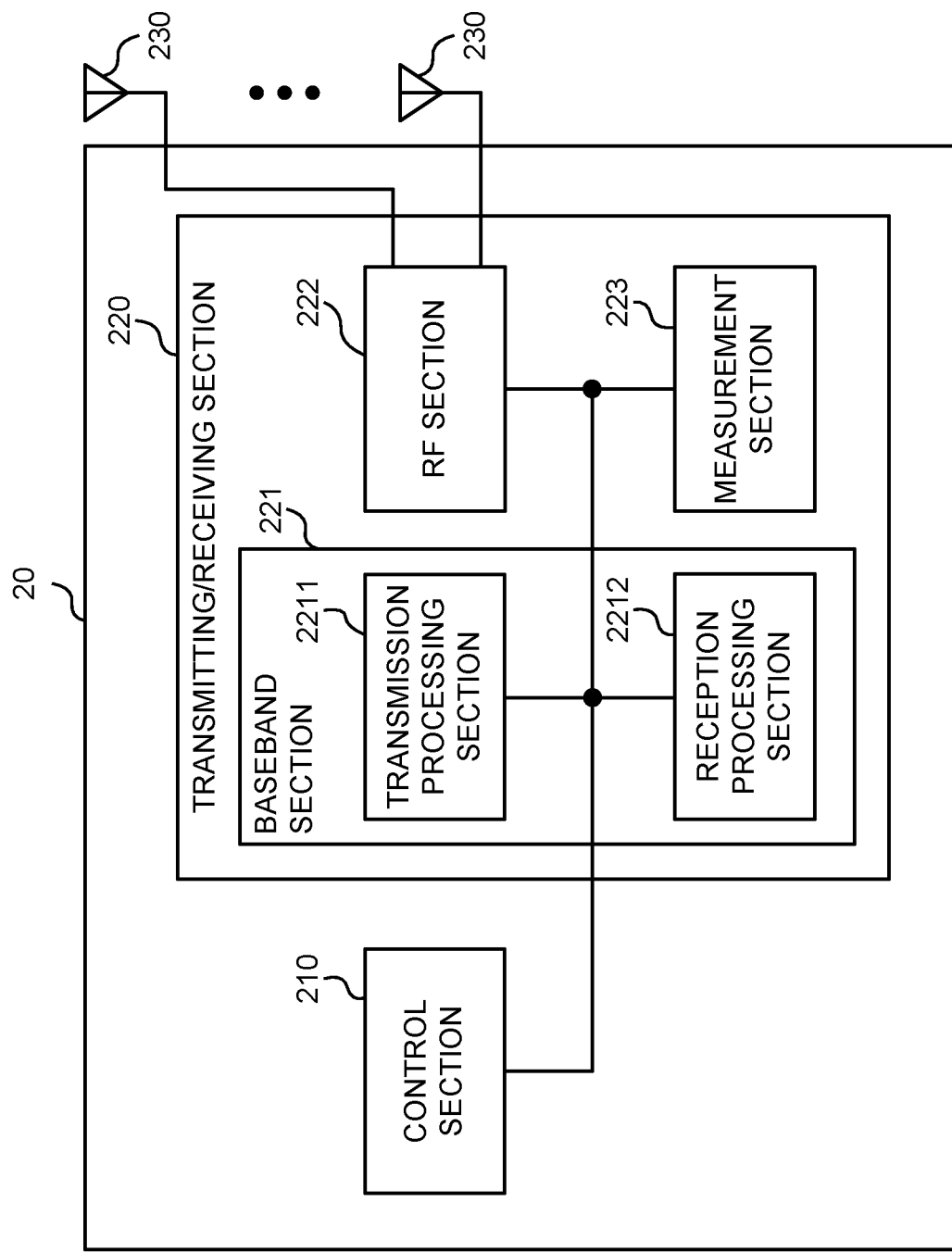
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may receive a CSI report configuration related to a joint channel state information (CSI) report.

The control section 210 may determine the number of CSI parameters to be reported per CSI reporting pair, based on information included in the CSI report configuration, and perform control to include the joint CSI report in the CSI reporting pair.

The control section 210 may perform control to include, in the joint CSI report, the CSI reporting pair including two rank indicators (RIs), two layer indicators (LIs), two precoding matrix indicators (PMIs), and one channel quality indicator (CQI), based on the information included in the CSI report configuration.

The control section 210 may perform control to include, in the joint CSI report, the CSI reporting pair including one rank indicator (RI), two precoding matrix indicators (PMIs), and one channel quality indicator (CQI), based on the information included in the CSI report configuration.

The control section 210 may perform control to include, in the joint CSI report, the CSI reporting pair including one rank indicator (RI), one precoding matrix indicator (PMI), and one channel quality indicator (CQI), based on the information included in the CSI report configuration.

The transmitting/receiving section 220 may receive a CSI report configuration indicating that at least one of channel state information (CSI) for a single transmission/reception point (STRP) and CSI for multi-TRP (Multi TRP (MTRP)) is reported.

The control section 210 may perform control to include, in the CSI report, at least one of the CSI for a STRP and the CSI for MTRP, based on information included in the CSI report configuration.

When only one of the CSI for a STRP and the CSI for MTRP is included in the CSI report, based on the information included in the CSI report configuration, the control section 210 may include, in the CSI report, a bit field indicating whether the CSI report is the CSI for a STRP or the CSI for MTRP.

Irrespective of whether the CSI for a STRP or the CSI for MTRP is included in the CSI report, the control section 210 may control the CSI report to have the same payload size.

When only of the CSI for MTRP is included in the CSI report, based on the information included in the CSI report configuration, the control section 210 may configure the CSI report of CSI part 1 which is constituted of part of the CSI for MTRP having the same payload size as a size of the CSI for a STRP, and CSI part 2 which is constituted of the remaining part of the CSI for MTRP.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
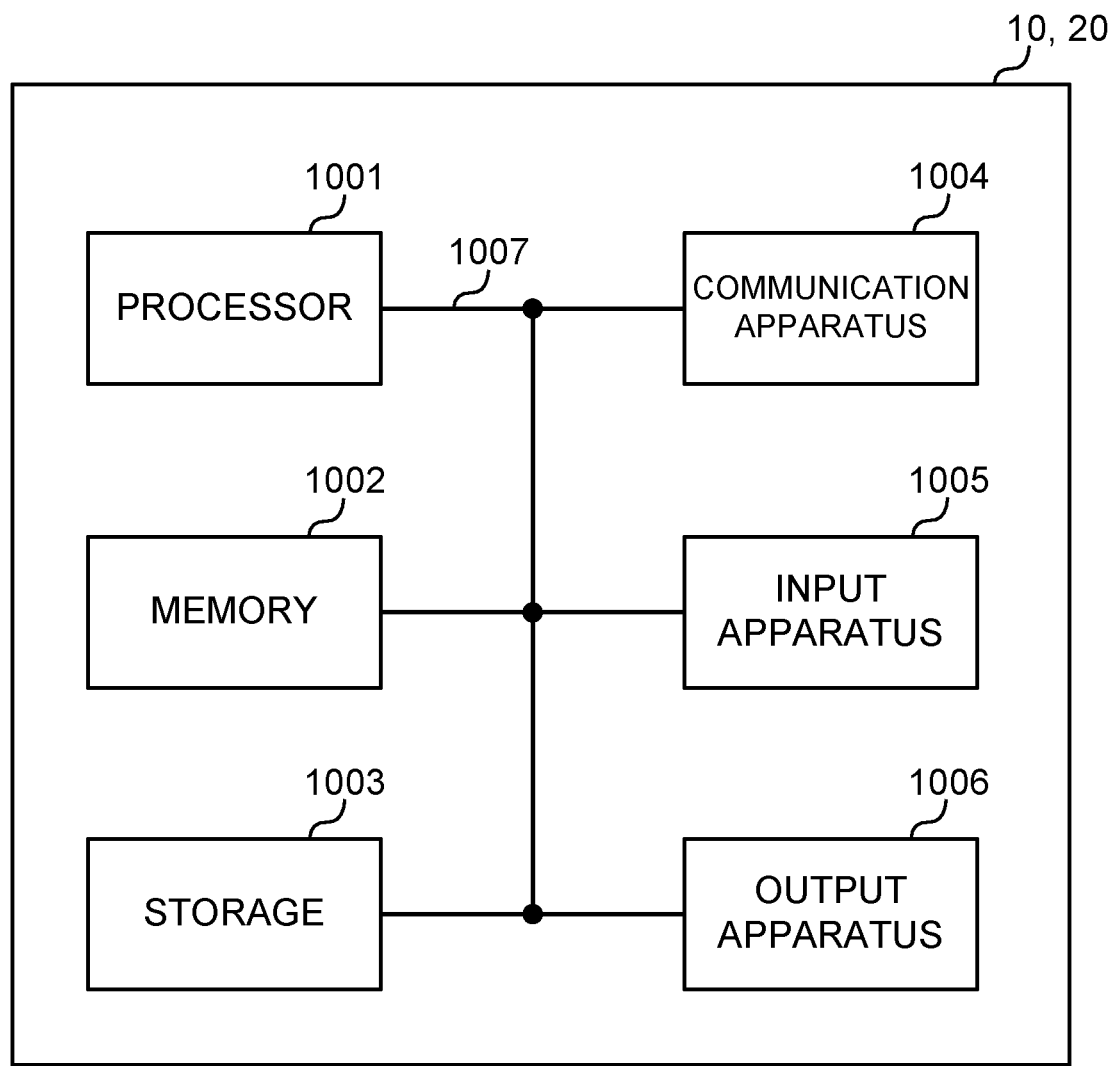
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

report of information is by no means limited to the aspects/embodiments described in the present disclosure, and other methods may be used as well. For example, report of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, report of certain information (for example, report of "X holds") does not necessarily have to be reported explicitly, and can be reported implicitly (by, for example, not report this certain information or report another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
    a receiver that receives a first channel state information (CSI) report configuration indicating that at least one of CSI for single transmission/reception point (STRP) and CSI for multi TRP (MTRP) is reported, and a second CSI report configuration indicating that both of CSI for STRP and CSI for MTRP are reported; and
    a processor that:
        performs a first control, based on information included in the first CSI report configuration, to include at least one of the CSI for STRP and the CSI for MTRP in a first CSI report, and
        performs a second control for reporting a second CSI report based on:
            a configuration for one or two CSIs for STRP included in the second CSI report configuration, and
            a configuration for one CSI reporting pair for MTRP included in the second CSI report configuration,
        wherein the processor performs the first control when selection between the CSI for STRP and the CSI for MTRP is supported in the first CSI report for the first CSI report configuration, and performs the second control when both the CSI for STRP and the CSI for MTRP are supported in the second CSI report for the second CSI report configuration.

2. The terminal according to claim 1, wherein the processor includes, in the CSI report, a bit field indicating whether the CSI report corresponds to the CSI for STRP or corresponds to the CSI for MTRP.

3. The terminal according to claim 1, wherein when the CSI for MTRP is included in the CSI report, the processor performs a control, based on information included in the CSI report configuration, to include a CSI reporting pair in the CSI report, the CSI reporting pair including two rank indicators (RIs), two layer indicators (LIs), two precoding matrix indicators (PMIs), and one channel quality indicator (CQI).

4. A radio communication method for a terminal, comprising:

receiving a first channel state information (CSI) report configuration indicating that at least one of CSI for single transmission/reception point (STRP) and CSI for multi TRP (MTRP) is reported, and a second CSI report configuration indicating that both of CSI for STRP and CSI for MTRP are reported;

performing a first control, based on information included in the first CSI report configuration, to include at least one of the CSI for STRP and the CSI for MTRP in a first CSI report, and performing a second control for reporting a second CSI report based on:
　a configuration for one or two CSIs for STRP included in the second CSI report configuration, and
　a configuration for one CSI reporting pair for MTRP included in the second CSI report configuration, wherein the terminal performs the first control when selection between the CSI for STRP and the CSI for MTRP is supported in the first CSI report for the first CSI report configuration, and performs the second control when both the CSI for STRP and the CSI for MTRP are supported in the second CSI report for the second CSI report configuration.

5. A base station comprising:

a transmitter that transmits, to a terminal, a first channel state information (CSI) report configuration indicating that at least one of CSI for single transmission/reception point (STRP) and CSI for multi TRP (MTRP) is reported, and a second CSI report configuration indicating that both of CSI for STRP and CSI for MTRP are reported; and a receiver that:
　receives, from the terminal, a first CSI report in which at least one of the CSI for STRP and the CSI for MTRP is included by the terminal based on information included in the first CSI report configuration, and
　receives, from the terminal, a second CSI report based on:
　　a configuration for one or two CSIs for STRP included in the second CSI report configuration, and
　　a configuration for one CSI reporting pair for MTRP included in the second CSI report configuration, wherein the receiver receives the first CSI report when selection between the CSI for STRP and the CSI for MTRP is supported in the first CSI report for the first CSI report configuration, and receives the second CSI report when both the CSI for STRP and the CSI for MTRP are supported in the second CSI report for the second CSI report configuration.

6. A system comprising a terminal and a base station, wherein the terminal comprises:
　a receiver that receives a first channel state information (CSI) report configuration indicating that at least one of CSI for single transmission/reception point (STRP) and CSI for multi TRP (MTRP) is reported, and a second CSI report configuration indicating that both of CSI for STRP and CSI for MTRP are reported; and
　a processor that:
　　performs a first control, based on information included in the first CSI report configuration, to include at least one of the CSI for STRP and the CSI for MTRP in a first CSI report, and
　　performs a second control for reporting a second CSI report based on:
　　　a configuration for one or two CSIs for STRP included in the second CSI report configuration, and
　　　a configuration for one CSI reporting pair for MTRP included in the second CSI report configuration,
　wherein the processor performs the first control when selection between the CSI for STRP and the CSI for MTRP is supported in the first CSI report for the first CSI report configuration, and performs the second control when both the CSI for STRP and the CSI for MTRP are supported in the second CSI report for the second CSI report configuration, and the base station comprises:
　a transmitter that transmits the first CSI report configuration and the second CSI report configuration to the terminal; and
　a receiver that receives the first CSI report and the second CSI report from the terminal.

* * * * *